US012680554B2

(12) United States Patent
Komiya et al.

(10) Patent No.: US 12,680,554 B2
(45) Date of Patent: Jul. 14, 2026

(54) COOLING COMPONENT FOR AUTOMOBILE AND MANUFACTURING METHOD OF COOLING COMPONENT FOR AUTOMOBILE

(71) Applicant: YAMADA MANUFACTURING CO., LTD., Gunma (JP)

(72) Inventors: Kenichi Komiya, Kumagaya (JP); Keisuke Kashiwa, Midori (JP); Satoshi Watanabe, Maebashi (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 19/069,351

(22) Filed: Mar. 4, 2025

(65) Prior Publication Data

US 2025/0290521 A1     Sep. 18, 2025

(30) Foreign Application Priority Data

Mar. 18, 2024     (JP) ................................. 2024-042634

(51) Int. Cl.
*F04D 29/42*          (2006.01)
*B29C 65/00*          (2006.01)
(Continued)

(52) U.S. Cl.
CPC ........ *F04D 29/426* (2013.01); *B29C 66/1312* (2013.01); *B29C 66/30223* (2013.01); *B29C 66/322* (2013.01); *B29C 66/73921* (2013.01); *F04D 13/06* (2013.01); *F04D 13/0606* (2013.01); *F04D 13/0613* (2013.01); *F04D 13/0626* (2013.01); *F04D 23/008* (2013.01); *F04D 29/026* (2013.01);
(Continued)

(58) Field of Classification Search
CPC .......... B29C 66/73921; B29C 66/1312; B29C 66/322; B29C 66/30223; F04D 29/426; F04D 29/026; F04D 29/628; F04D 13/0626; F04D 13/0606; F04D 13/06; F04D 29/086; F04D 13/0613; F04D 29/4266; F04D 23/008; F04D 29/406; F04D 29/605; F04C 23/008
See application file for complete search history.

(56) References Cited

U.S. PATENT DOCUMENTS 9,022,757 B2 *   5/2015   Shin .................... F04C 29/0035
                                                           418/58
2024/0102477 A1 *   3/2024   Hu ...................... F04D 13/0626

FOREIGN PATENT DOCUMENTS

JP             6891565 B2     6/2021
WO      WO-2022111426 A1 *   6/2022   ........... F04D 29/426

* cited by examiner

*Primary Examiner* — Peter J Bertheaud
(74) *Attorney, Agent, or Firm* — Rankin, Hill & Clark LLP

(57)          ABSTRACT

A cooling component for an automobile has a case and a cover. A direction along a central axis is a first direction, and a direction perpendicular to the central axis is a second direction. One of a case weld portion and a cover weld portion is referred to as a first weld portion, and the other thereof is referred to as a second weld portion. At this time, an inclined surface, which is inclined from the inward side to the outward side in the second direction away from the second weld portion, is formed at a tip end of the first weld portion in the first direction. A flat surface intersecting with the first direction is formed at a tip end of the second weld portion in the first direction. The first weld portion and the second weld portion are joined to each other by welding.

5 Claims, 5 Drawing Sheets

(51) Int. Cl.

| | |
|---|---|
| *F04D 13/06* | (2006.01) |
| *F04D 23/00* | (2006.01) |
| *F04D 29/02* | (2006.01) |
| *F04D 29/08* | (2006.01) |
| *F04D 29/40* | (2006.01) |
| *F04D 29/60* | (2006.01) |
| *F04D 29/62* | (2006.01) |

(52) U.S. Cl.

CPC ......... *F04D 29/086* (2013.01); *F04D 29/406* (2013.01); *F04D 29/4266* (2013.01); *F04D 29/605* (2013.01); *F04D 29/628* (2013.01)

FIG. 3

COOLING COMPONENT FOR AUTOMOBILE AND MANUFACTURING METHOD OF COOLING COMPONENT FOR AUTOMOBILE

CROSS-REFERENCE TO RELATED APPLICATION

Priority is claimed on Japanese Patent Application No. 2024-042634, filed Mar. 18, 2024, the content of which is incorporated herein by reference.

BACKGROUND OF THE INVENTION

Field of the Invention

The present invention relates to a cooling component for an automobile and a method for manufacturing a cooling component for an automobile.

Description of Related Art

An electric water pump or the like for circulating cooling water between an engine and a radiator is used as a cooling component for an automobile. A pump such as an electric water pump has a case and a cover. The case accommodates constituent components of the pump. The cover covers an opening of the case. The case and the cover are formed from a resin material and are joined to each other by vibration welding. A powder burr is generated due to friction during the vibration welding. There is a demand for a cooling component for an automobile in which a powder burr is less likely to remain inside (see, for example, Patent Document 1 below).

[Patent Document 1] Japanese Patent No. 6891565

SUMMARY OF THE INVENTION

An object of the present invention is to provide a cooling component for an automobile in which powder burrs are less likely to remain inside, and a method for manufacturing the cooling component for an automobile.

To solve the above problem, the present invention has employed the following aspects.

(1) According to an aspect of the present invention, there is provided a cooling component for an automobile, including: a case that has a case opening at an end portion in a first direction along a central axis, accommodates components of a pump on an inward side in a second direction perpendicular to the central axis, and has a case weld portion along a peripheral edge of the case opening; and a cover that is disposed side by side with a side of the case in the first direction, has a cover opening facing the case opening, and has a cover weld portion along a peripheral edge of the cover opening, wherein, when one of the case weld portion and the cover weld portion is referred to as a first weld portion, and the other thereof is referred to as a second weld portion, an inclined surface, which is inclined from an inward side to an outward side in the second direction away from the second weld portion, is formed at a tip end of the first weld portion in the first direction, a flat surface intersecting with the first direction is formed at a tip end of the second weld portion in the first direction, and the first weld portion and the second weld portion are joined to each other by welding.

According to this aspect, the inclined surface is formed at the tip end of the first weld portion, and thus a contact area is reduced and a surface pressure is increased at a contact portion between the first weld portion and the second weld portion. A temperature of the contact portion rises quickly due to frictional heat between the first weld portion and the second weld portion. Rubbing at the contact portion ends in a short time, and the contact portion is melted quickly. As a result, the generation of powder burrs due to the rubbing at the contact portion is suppressed. The inclined surface of the first weld portion comes into contact with the second weld portion in order from the inward side in the second direction. The inward side in the second direction of the portion in which the powder burrs are generated is already melted. The generated powder burrs are less likely to scatter to the inward side in the second direction. As a result, it is difficult for the powder burrs to remain inside the cooling component for an automobile.

(2) In the above aspect (1), a volume of an outer weld burr that extends to an outward side in the second direction from a weld layer between the first weld portion and the second weld portion may be smaller than a volume of an inner weld burr that extends to an inward side in the second direction from the weld layer.

According to this aspect, the inclined surface is formed at the tip end of the first weld portion, and thus the volume of a melt region of the first weld portion decreases from the inward side to the outward side in the second direction. For this reason, the volume of the outer weld burr generated due to the melting of the melt region is smaller than the volume of the inner weld burr.

(3) In the above aspect (1) or (2), the cooling component for an automobile may further include: an inner standing wall that is disposed away from the first weld portion and the second weld portion to an inward side in the second direction; and an outer standing wall that is disposed away from the first weld portion and the second weld portion to an outward side in the second direction.

According to this aspect, the inner standing wall prevents the inner weld burr from flowing into the inside of the cooling component for an automobile. The outer standing wall prevents the outer weld burr from flowing out to the outside of the cooling component for an automobile.

(4) According to another aspect of the present invention, there is provided a method for manufacturing a cooling component for an automobile, wherein, in a pump which includes: a case that has a case opening at an end portion in a first direction along a central axis, accommodates components of the pump on an inward side in a second direction perpendicular to the central axis, and has a case weld portion along a peripheral edge of the case opening; and a cover that is disposed side by side with a side of the case in the first direction, has a cover opening facing the case opening, and has a cover weld portion along a peripheral edge of the cover opening, when one of the case weld portion and the cover weld portion is referred to as a first weld portion, and the other thereof is referred to as a second weld portion, an inclined surface, which is inclined from an inward side to an outward side in the second direction away from the second weld portion, is formed at a tip end of the first weld portion in the first direction, a flat surface intersecting with the first direction is formed at a tip end of the second weld portion in the first direction, and the first weld portion and the second weld portion are joined to each other by welding.

According to this aspect, the inclined surface is formed at the tip end of the first weld portion, and thus a contact area is reduced and a surface pressure is increased at a contact portion between the first weld portion and the second weld portion. A temperature of the contact portion rises quickly due to frictional heat between the first weld portion and the second weld portion. Rubbing at the contact portion ends in a short time, and the contact portion is melted quickly. As a result, the generation of powder burrs due to the rubbing at the contact portion is suppressed. The inclined surface of the first weld portion comes into contact with the second weld portion in order from the inward side in the second direction. The inward side in the second direction of the portion in which the powder burrs are generated is already melted. The generated powder burrs are less likely to scatter to the inward side in the second direction. As a result, it is difficult for the powder burrs to remain inside the cooling component for an automobile.

(5) In the above aspect (4), a flat surface intersecting with the first direction may be formed on an inward side of the inclined surface in the second direction at a tip end of the first weld portion in the first direction, and the first weld portion and the second weld portion may be joined to each other by welding.

According to this aspect, the flat surface of the first weld portion comes into contact with the second weld portion, and thus damage to the tip end of the first weld portion is suppressed.

(6) In the above aspect (4) or (5), when a region of the first weld portion which is melted by the welding is referred to as a melt region, a height of the inclined surface in the first direction may be smaller than a height of the melt region in the first direction.

According to this aspect, the melt region has a tip end region in which the inclined surface is present, and a base end region in which the inclined surface is not present. In the base end region in which the inclined surface is not present, the welding is performed in a state in which the surface pressure at the contact portion is low. At this time, the welding between the first weld portion and the second weld portion progresses slowly, and the weld layer becomes thick. Therefore, the decrease in welding strength can be suppressed.

(7) In any one of the above aspects (4) to (6), a width of the second weld portion in the second direction may be larger than a width of the first weld portion in the second direction.

According to this aspect, the welding is performed in a state in which the contact between the tip end of the first weld portion, on which the inclined surface is formed, and the second weld portion is maintained.

According to the aspects of the present invention, it is possible to provide a cooling component for an automobile in which powder burrs are less likely to remain inside, and a method for manufacturing the cooling component for an automobile.

BRIEF DESCRIPTION OF THE DRAWINGS

FIG. 3 is a first explanatory diagram of a method for manufacturing the pump according to the embodiment.

DETAILED DESCRIPTION OF THE INVENTION

Hereinafter, a cooling component for an automobile and a method for manufacturing a cooling component for an automobile according to an embodiment of the present invention will be described with reference to the drawings. The cooling component for an automobile of the embodiment is, for example, a pump such as an electric water pump for circulating cooling water between an engine and a radiator.

Figure 1:
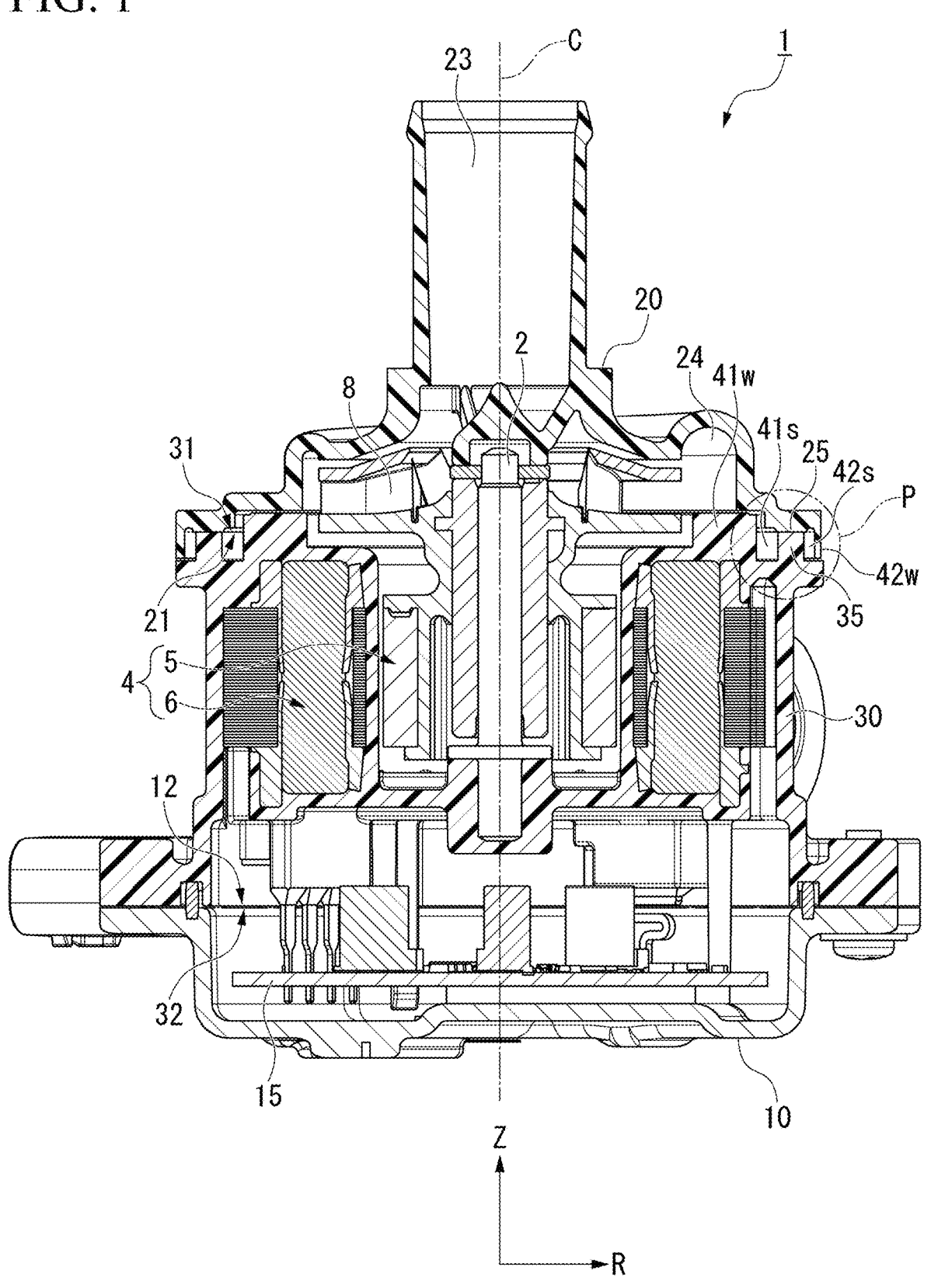
FIG. 1 is a cross-sectional view of a pump according to an embodiment.

FIG. 1 is a cross-sectional view of a pump 1 according to the embodiment. The pump 1 sucks in a fluid through a suction port 23 and discharges a fluid through a discharge port 24. The pump 1 is formed in a substantially circular cylindrical shape.

In the following description, a Z direction and an R direction of the cylindrical coordinate system are defined as follows.

The Z direction (a first direction) is a direction along a central axis C of the pump 1. A +Z direction is a direction in which a cover 20 is disposed as viewed from a case 30, and a −Z direction is a direction in which a cap 10 is disposed as viewed from the case 30.

The R direction (a second direction) is a direction perpendicular to the Z direction and is a radial direction of the pump 1. A +R direction is a direction away from the central axis C of the pump 1, and a −R direction is a direction approaching the central axis C of the pump 1. A side in the +R direction may be referred to as an outward side in the R direction, and a side in the −R direction may be referred to as an inward side in the R direction.

The pump 1 has the case 30, the cover 20, and the cap 10. The case 30, the cover 20, and the cap 10 are formed from a thermoplastic resin material such as polyphenylene sulfide (PPS). The cap 10 may be formed from a metallic material such as aluminum.

The case 30 accommodates the components of the pump 1 on the inward side in the R direction. The case 30 has a case first opening (a case opening) 31 at an end portion thereof in the +Z direction, and a case second opening 32 at an end portion thereof in the −Z direction.

The cover 20 is disposed side by side with a side of the case 30 in the +Z direction and covers the case first opening 31. The cover 20 has a cover opening 21 at an end portion thereof in the −Z direction. The cover opening 21 faces the case first opening 31. The cover 20 has the suction port 23 and the discharge port 24 for a fluid formed therein.

The cap 10 is disposed side by side with a side of the case 30 in the −Z direction and covers the case second opening 32. The cap 10 is attachable to or detachable from the case 30.

The pump 1 has a shaft 2, a motor 4, a control board 15, and an impeller 8. The shaft 2 is disposed coaxially with the central axis C. An end portion of the shaft 2 in the −Z direction is supported by the case 30, and an end portion of the shaft 2 in the +Z direction is supported by the cover 20.

The motor 4 includes a rotor 5 and a stator 6. The rotor 5 is disposed around the shaft 2 and is rotatable. The stator 6 is disposed around the rotor 5 and supported by the case 30.

The control board 15 is disposed on a side in the −Z direction with respect to the case 30 and is accommodated inside the cap 10. The control board 15 controls an operation of the motor 4.

The impeller 8 is fixed to a side of the rotor 5 in the +Z direction. The impeller 8 is accommodated inside the cover 20. The suction port 23 of the cover 20 is open to a side of the impeller 8 in the +Z direction. The discharge port 24 of the cover 20 is open to a side of an outer periphery of the impeller 8 in a tangential direction of the outer periphery.

Under the control of the control board 15, the rotor 5 of the motor 4 rotates. The impeller 8 rotates together with the rotor 5, and a fluid is sucked in through the suction port 23 and discharged through the discharge port 24.

Figure 2:
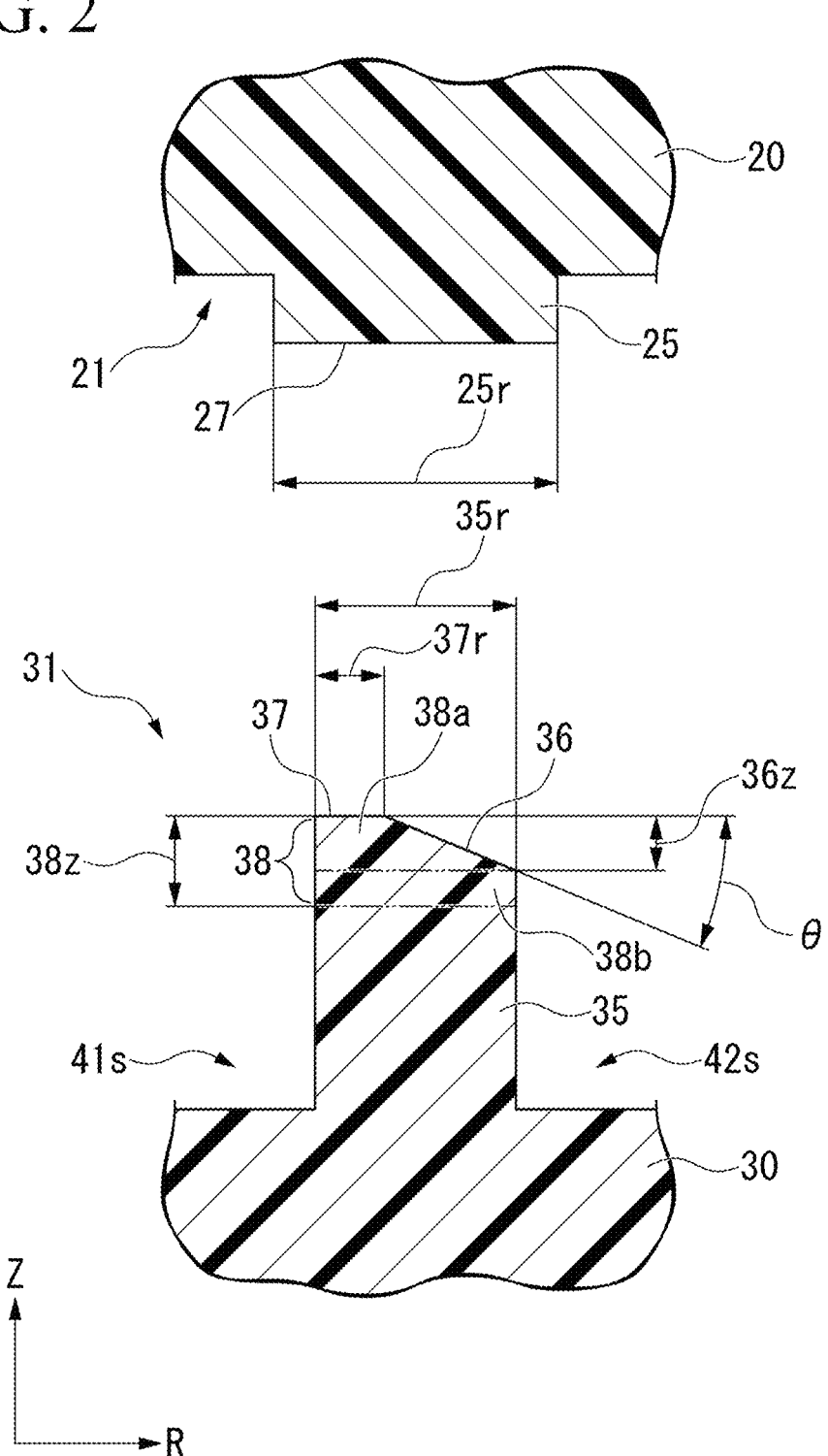
FIG. 2 is a cross-sectional view of a case weld portion and a cover weld portion.

FIG. 2 is an enlarged view of a portion P in FIG. 1, and is a cross-sectional view of a cover weld portion 25 and a case weld portion 35. The cover 20 has the cover weld portion 25, and the case 30 has the case weld portion 35.

The cover weld portion 25 is formed along a peripheral edge of the cover opening 21. The cover weld portion 25 has a substantially circular ring shape as viewed in the −Z direction. The cover weld portion 25 protrudes in the −Z direction. Side surfaces of the cover weld portion 25 in the ±R direction are tapered surfaces that are slightly inclined with respect to the Z direction. A tip end surface 27 of the cover weld portion 25 in the −Z direction is a flat surface intersecting with the Z direction. The tip end surface 27 may be a flat surface perpendicular to the Z direction.

The case weld portion 35 is formed along a peripheral edge of the case first opening 31. The case weld portion 35 has a substantially circular ring shape as viewed in the +Z direction. The case weld portion 35 protrudes in the +Z direction. Side surfaces of the case weld portion 35 in the ±R direction are tapered surfaces that are slightly inclined with respect to the Z direction. A width 35r of the case weld portion 35 in the R direction is smaller than a width 25r of the cover weld portion 25 in the R direction. An end portion of the case weld portion 35 in the +Z direction is a melt region 38. The melt region 38 is melted through vibration welding, which will be described below, and the case weld portion 35 and the cover weld portion 25 are joined to each other.

A flat surface 37 and an inclined surface 36 are formed at a tip end of the case weld portion 35 in the +Z direction. The flat surface 37 is formed on the inward side in the R direction (on the side in the −R direction). The flat surface 37 intersects with the Z direction. The flat surface 37 may be perpendicular to the Z direction. For example, a width 37r of the flat surface 37 in the R direction is about one third the width 35r of the case weld portion 35. The inclined surface 36 is formed on the outward side in the R direction (on the side in +R direction). The inclined surface 36 is inclined from the inward side to the outward side in the R direction away from the cover weld portion 25. In the example of FIG. 2, the inclined surface 36 is a flat surface. The inclined surface 36 is inclined at an inclination angle θ with respect to the flat surface 37.

Due to the presence of the inclined surface 36, a height 38z of the melt region 38 in the Z direction decreases from the inward side to the outward side in the R direction. The volume of the melt region 38 per unit length in the R direction decreases from the inward side to the outward side in the R direction.

The height 36z of the inclined surface 36 in the Z direction is smaller than the height 38z of the melt region 38 in the Z direction. For example, the height 36z of the inclined surface 36 is approximately half the height 38z of the melt region 38.

As a result, a width in the R direction of a lower half portion of the melt region 38 in the −Z direction is the same as the width 35r of the case weld portion 35.

The pump 1 has an inner space 41s and an outer space 42s. The inner space 41s is formed on sides of the case weld portion 35 and the cover weld portion 25 in the −R direction. The outer space 42s is formed on sides of the case weld portion 35 and the cover weld portion 25 in the +R direction. As shown in FIG. 1, the periphery of the inner space 41s and the outer space 42s is covered by the case 30 and the cover 20.

A side of the inner space 41s in the −R direction is covered by an inner standing wall 41w. The inner standing wall 41w is disposed away from the case weld portion 35 and the cover weld portion 25 in the −R direction. The inner standing wall 41w protrudes from the case 30 in the +Z direction, but may protrude from the cover 20 in the −Z direction.

A side of the outer space 42s in the +R direction is covered by an outer standing wall 42w. The outer standing wall 42w is disposed away from the case weld portion 35 and the cover weld portion 25 in the +R direction. The outer standing wall 42w protrudes from the cover 20 in the −Z direction, but may protrude from the case 30 in the +Z direction.

A method for manufacturing the pump 1 of the embodiment, which includes vibration welding between the case weld portion 35 and the cover weld portion 25, will be described.

Figure 3:
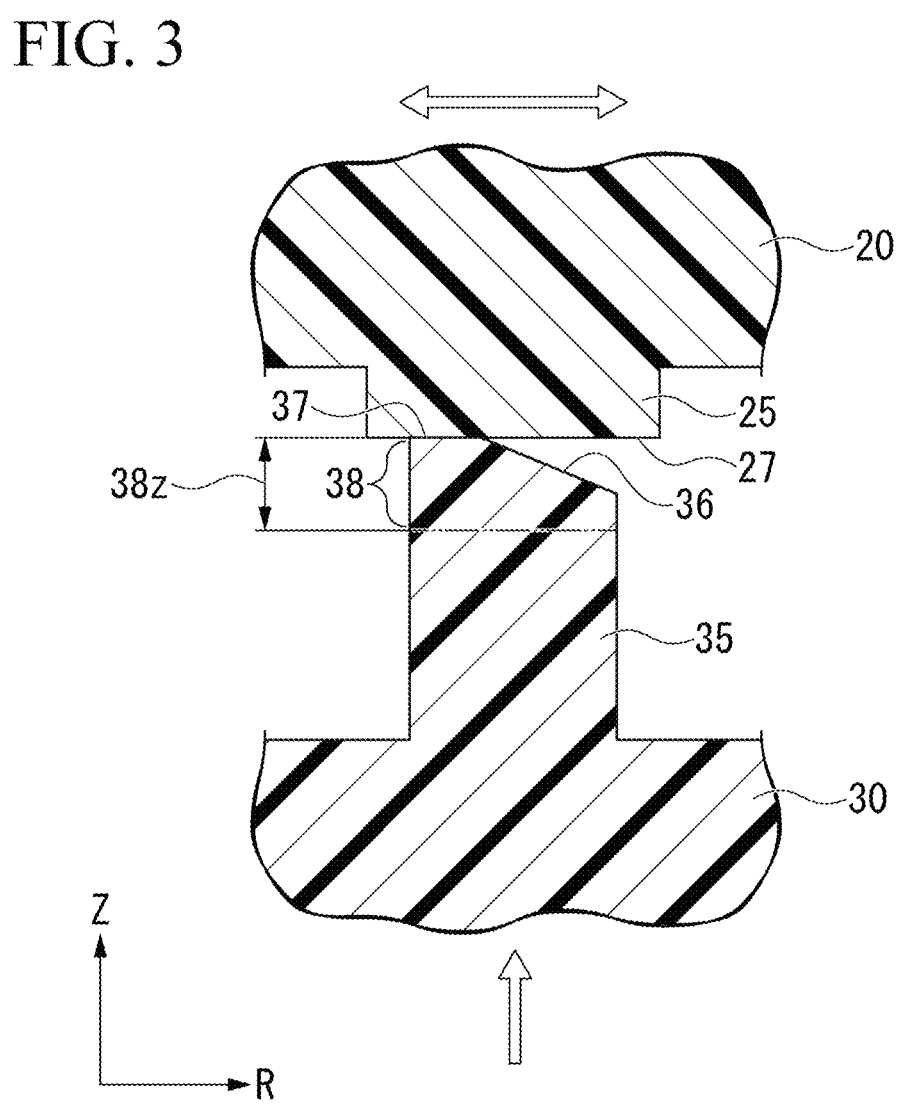
Figure 4:
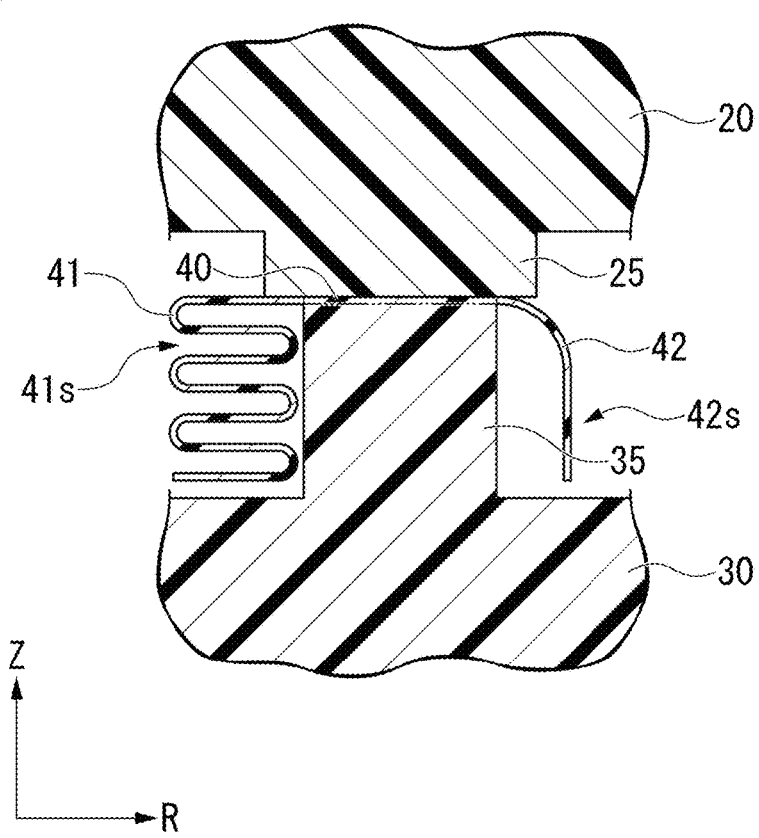
FIG. 4 is a second explanatory diagram of the method for manufacturing the pump according to the embodiment.

FIG. 3 is a first explanatory diagram of the method for manufacturing the pump 1 according to the embodiment, and FIG. 4 is a second explanatory diagram thereof. First, the components of the pump 1 are housed inside the case 30. The cover 20 is disposed on a side of the case 30 in the +Z direction.

The case weld portion 35 and the cover weld portion 25 are vibration welded to each other. Specifically, as shown in FIG. 3, the flat surface 37 of the case weld portion 35 comes into contact with the tip end surface 27 of the cover weld portion 25. In this case, the flat surface 37 of the case weld portion 35 comes into contact with the tip end surface 27 of the cover weld portion 25, and thus damage to the tip end of the case weld portion 35 is suppressed as compared to a case in which the flat surface 37 is not present at the tip end of the case weld portion 35. The cover 20 is vibrated linearly in the R direction. Since the cover 20 is vibrated, vibration of the pump components accommodated inside the case 30 is avoided. The case 30 is pressed toward the cover 20 in the +Z direction. A contact portion between the case weld portion 35 and the cover weld portion 25 is melted due to frictional heat. The cover 20 moves in the −Z direction by the height 38z of the melt region 38 in the case weld portion 35.

The case weld portion 35 and the cover weld portion 25 are thermally melted through vibration welding. As described above with reference to FIG. 2, the width 35r of the case weld portion 35 in the R direction is smaller than the width 25r of the cover weld portion 25 in the R direction. Heat of the case weld portion 35 is less likely to escape to the surroundings as compared to that of the cover weld portion 25. For this reason, the case weld portion 35 is melted preferentially.

FIG. 4 shows a state after the vibration welding is completed. When the melt region 38 of the case weld portion 35 is melted, a weld layer 40 is formed between the case weld portion 35 and the cover weld portion 25. The case weld portion 35 and the cover weld portion 25 are joined to each other with the weld layer 40. The thickness of the weld layer 40 in the Z direction is less than the height 38z of the melt region 38 (see FIG. 3). When the melt region 38 is melted, an inner weld burr 41 and an outer weld burr 42 are generated. The inner weld burr 41 extends from the weld layer 40 in the −R direction, and the outer weld burr 42 extends from the weld layer 40 in the +R direction.

The inner weld burr 41 is accommodated in the inner space 41s, and the outer weld burr 42 is accommodated in the outer space 42s. The inner standing wall 41w (see FIG. 1) that covers a side of the inner space 41s in the −R direction prevents the inner weld burr 41 from flowing into the inside of the pump 1. The outer standing wall 42w (see FIG. 1) that covers a side of the outer space 42s in the +R direction prevents the outer weld burr 42 from flowing out to the outside of the pump 1.

As described above with reference to FIG. 2, the inclined surface 36 is formed at the tip end of the case weld portion 35. The inclined surface 36 is inclined from the inward side to the outward side in the R direction away from the cover weld portion 25. The volume of the melt region 38 per unit length in the R direction decreases from the inward side to the outward side in the R direction. For this reason, the volume of the outer weld burr 42 generated due to the melting of the melt region 38 is smaller than the volume of the inner weld burr 41.

The vibration welding causes powder burrs in addition to the weld burrs. A mechanism by which the powder burrs are generated will be described with reference to FIG. 5.

Figure 5:
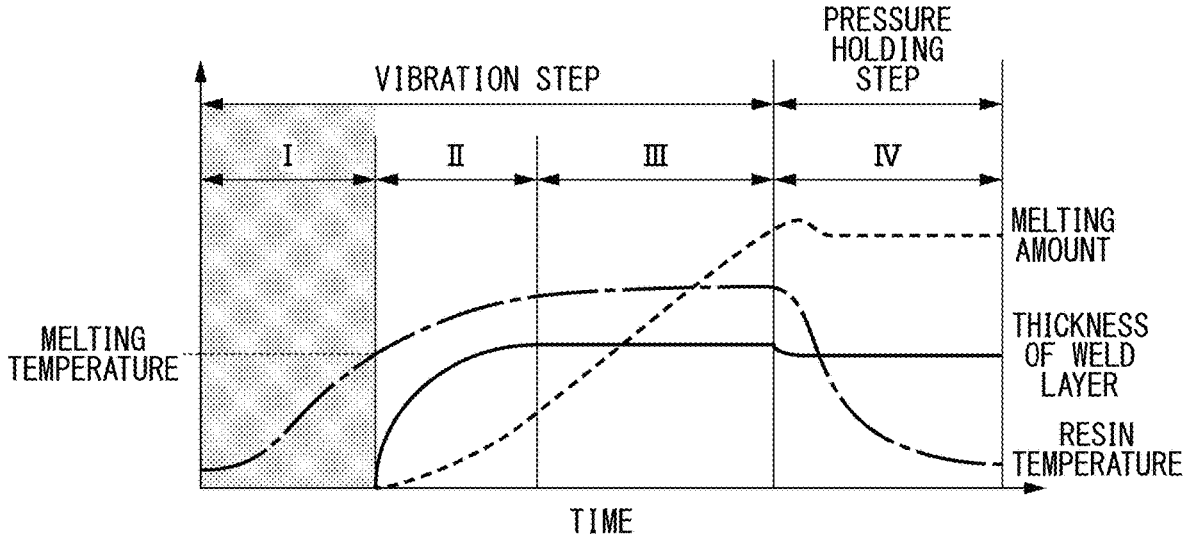
FIG. 5 is a graph showing changes in various portions due to vibration welding.

FIG. 5 is a graph showing changes in various portions due to the vibration welding. A horizontal axis of FIG. 5 represents a time, and a vertical axis represents a temperature and a thickness. The vibration welding includes a vibration step and a pressure holding step. The vibration step has a friction region I, a transition region II, and a steady state region III. The pressure holding step has a solidification region IV.

In the friction region I, friction between the case weld portion 35 and the cover weld portion 25 causes the temperature of the resin material that constitutes the two to rise. When the temperature of the resin material exceeds a melting temperature, the transition region II starts.

In the transition region II, the resin material softens and deforms above a glass transition point. In transition region II, the melting amount of the melt region 38 and the thickness of the weld layer 40 increase.

In the steady state region III, the melting of the resin material progresses, and the melting amount of the melt region 38 increases. In the steady state region III, the thickness of the weld layer 40 does not increase, and the inner weld burr 41 and an outer weld burr 42 are generated.

In the solidification region IV, the weld layer 40 cools and solidifies.

In the friction region I, the case weld portion 35 and the cover weld portion 25 rub against each other, and thus the powder burrs of the resin material are generated. The generated powder burrs scatter inside and outside the pump 1. The powder burrs remaining inside the pump 1 may affect the performance, durability, and the like of the pump 1. There is a demand for a pump in which the powder burrs are less likely to remain inside, and a method for manufacturing the pump.

As described above, the inclined surface 36 is formed at the tip end of the case weld portion 35. At the start of the vibration welding, only the flat surface 37 of the case weld portion 35 comes into contact with the tip end surface 27 of the cover weld portion 25. At the contact portion between the two, the friction region I starts. Since the contact area of the contact portion is small and the surface pressure thereat is large, the temperature of the resin material rises quickly. When the temperature of the resin material exceeds a melting temperature, the transition region II starts at the contact portion. Since the inclined surface 36 is formed at the tip end of the case weld portion 35, the transition region II starts quickly at the contact portion. In the transition region II, the resin material is softened and melted, and thus no powder burrs are generated. As a result, the generation of the powder burrs is suppressed.

The tip end of the case weld portion 35 is melted, and the cover weld portion 25 is moved in the −Z direction. The inclined surface 36 is inclined from the inward side to the outward side in the R direction away from the cover weld portion 25. The inclined surface 36 comes into contact with the tip end surface 27 of the cover weld portion 25 in order from the inward side in the R direction. On the inclined surface 36, the friction region I starts in order from the inward side in the R direction, and the powder burrs are generated. Here, on the inward side in the R direction of the portion of the inclined surface 36 in which the friction region I has started, the resin material is already melted. For this reason, the generated powder burrs are less likely to scatter to the inward side in the R direction. Most of the powder burrs generated on the inclined surface 36 scatter to the outward side in the R direction. As a result, it is difficult for the powder burrs to remain inside the pump 1.

Figure 6:
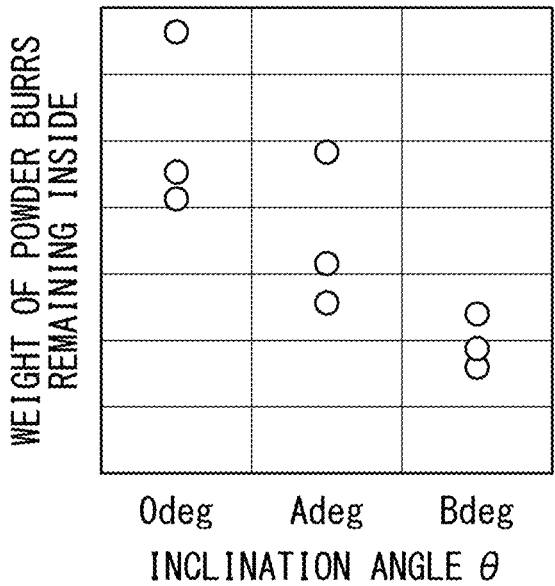
FIG. 6 is a graph showing a relationship between an inclination angle of an inclined surface and a weight of powder burrs remaining inside the pump.

FIG. 6 is a graph showing a relationship between the inclination angle θ of the inclined surface 36 and a weight of the powder burrs remaining inside the pump 1. A horizontal axis of FIG. 6 represents the inclination angle θ of the inclined surface 36 shown in FIG. 2. Cases in which θ is A deg and θ is B deg (A<B) are examples, and a case in which θ is 0 deg is a comparative example. In the comparative example in which θ is 0 deg, only the flat surface 37 is formed at the tip end of the case weld portion 35, and the inclined surface 36 is not formed. A vertical axis of FIG. 6 represents the weight of the powder burrs remaining inside the pump 1. The powder burrs remaining inside the pump 1 are collected from a cleaning liquid used to clean the inside of the pump 1 and are weighed.

In the examples in which θ is A deg and θ is B deg, the weight of the powder burrs remaining inside the pump 1 is small as compared to the comparative example in which θ is 0 deg. In the examples, it is considered that the case weld portion 35 has the inclined surface 36, and thus the scattering of the powder burrs to the inward side in the R direction is suppressed. In the case in which θ is B deg, the weight of the powder burrs remaining inside the pump 1 is small as compared to the case in which θ is A deg. In a case in which θ is B deg, the inclined surface 36 of the case weld portion 35 gradually comes into contact with the cover weld portion 25. For this reason, it is considered that the surface pressure at the contact portion between the two is constantly high, and thus the transition region II begins quickly.

As described above, in the vibration welding, the case 30 is pressed toward the cover 20 in the +Z direction. It is considered that if this pressurizing force is increased, the surface pressure at the contact portion between the case weld portion 35 and the cover weld portion 25 increases. However, it is known that, when the pressurizing force is increased, the welding between the two progresses fast, the weld layer 40 becomes thin, and the welding strength is decreased. If the welding strength is decreased, there is a possibility that the weld layer 40 may break (burst) in a case in which the internal pressure of the pump 1 is increased.

In the embodiment, the inclined surface 36 is formed at the tip end of the case weld portion 35. As a result, the surface pressure at the contact portion between the case weld portion 35 and the cover weld portion 25 increases without increasing the pressurizing force. As a result, the transition region II starts quickly, thereby suppressing the generation of the powder burrs.

As described above with reference to FIG. 2, the height 36z of the inclined surface 36 in the Z direction is smaller than the height 38z of the melt region 38 in the Z direction. In a tip end region 38a of the melt region 38 in the +Z direction in which the inclined surface 36 is present, the vibration welding is performed in a state in which the surface pressure at the contact portion is high. On the other hand, in a base end region 38b of the melt region 38 in the −Z direction in which the inclined surface 36 is not present, the vibration welding is performed in a state in which the surface pressure at the contact portion is low. At this time, the welding between the case weld portion 35 and the cover weld portion 25 progresses slowly, and the weld layer 40 becomes thick. Therefore, the decrease in welding strength can be suppressed.

Figure 7:
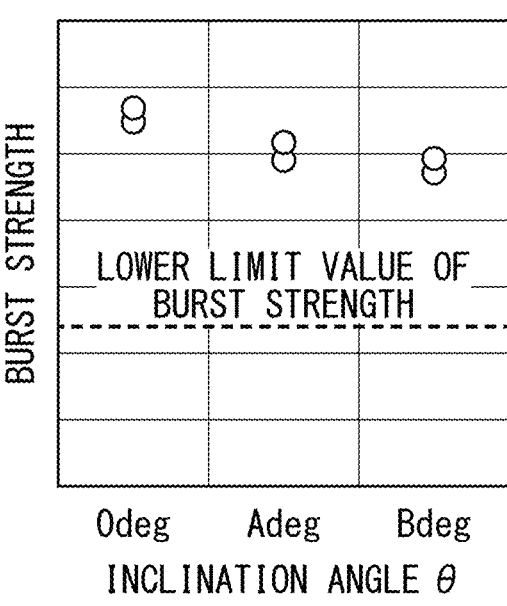
FIG. 7 is a graph showing a relationship between the inclination angle of the inclined surface and a burst strength of the pump.

FIG. 7 is a graph showing a relationship between the inclination angle θ of the inclined surface and a burst strength of the pump 1. A horizontal axis of FIG. 7 represents the inclination angle θ, which is the same as the horizontal axis of FIG. 6. A vertical axis of FIG. 7 represents the burst strength of the pump 1. The burst strength of the pump 1 is a pressure at which the weld layer 40 breaks when the suction port 23 and the discharge port 24 are sealed and the internal pressure of the pump 1 is increased.

In the examples in which θ is A deg and θ is B deg, the burst strength exceeds a lower limit value of the burst strength required for a product, similar to the comparative example in which θ is 0 deg. In the examples, the welding progresses slowly in the base end region 38b of the melt region 38 on a side in the −Z direction, in which the inclined surface 36 is not present. It is considered that, due to this, the weld layer 40 becomes thick and the welding strength is ensured. In the examples, the burst strength is slightly decreased as compared to the comparative example. It is considered that, in the examples, due to the influence of the tip end region 38a on a side in the +Z direction, in which the inclined surface 36 is present, the weld layer 40 becomes slightly thinner than that in the comparative example. In the case in which θ is B deg, the burst strength is slightly decreased as compared to the case in which θ is A deg. It is considered that, in the former, the tip end region 38a on a side in the +Z direction, in which the inclined surface 36 is present, is larger than that in the latter, and thus the weld layer 40 becomes slightly thinner than that in the latter.

As described above in detail, the pump 1 of the embodiment has the case 30 and the cover 20. The case 30 has case first opening 31 at the end portion in the Z direction along the central axis C. The case 30 accommodates the components of the pump 1 on the inward side in the R direction perpendicular to the central axis C. The case 30 has the case weld portion 35 along a peripheral edge of the case first opening 31. The cover 20 is disposed side by side with on a side of the case 30 in the Z direction. The cover 20 has the cover opening 21 that faces the case first opening 31. The cover 20 has a cover weld portion 25 along a peripheral edge of the cover opening 21. One of the case weld portion 35 and the cover weld portion 25 is referred to as a first weld portion, and the other thereof is referred to as a second weld portion. At this time, an inclined surface 36, which is inclined from the inward side to the outward side in the R direction away from the second weld portion, is formed at the tip end of the first weld portion in the Z direction. The tip end surface 27 intersecting with the Z direction is formed at the tip end of the second weld portion in the Z direction. The first weld portion and the second weld portion are joined to each other by the vibration welding.

In the embodiment, the case weld portion 35 is the first weld portion, and the cover weld portion 25 is the second weld portion. On the other hand, the cover weld portion 25 may be the first weld portion and the case weld portion 35 may be the second weld portion.

Since the inclined surface 36 is formed at the tip end of the first weld portion, the contact area is reduced and the surface pressure is increased at the contact portion between the first weld portion and the second weld portion. A temperature of the contact portion rises quickly due to frictional heat between the first weld portion and the second weld portion. Rubbing at the contact portion ends in a short time, and the contact portion is melted quickly. As a result, the generation of the powder burrs due to the rubbing at the contact portion is suppressed. The inclined surface 36 of the first weld portion comes into contact with the second weld portion in order from the inward side in the R direction. The inward side in the R direction of the portion in which the powder burrs are generated is already melted. The generated powder burrs are less likely to scatter to the inward side in the R direction. As a result, it is difficult for the powder burrs to remain inside the pump 1.

The volume of the outer weld burr 42 that extends to the outward side in the R direction from the weld layer 40 between the first weld portion and the second weld portion is smaller than the volume of the inner weld burr 41 that extends to the inward side in the R direction from the weld layer 40. Since the inclined surface 36 is formed at the tip end of the first weld portion, the volume of the melt region 38 of the first weld portion decreases from the inward side to the outward side in the R direction. For this reason, the volume of the outer weld burr 42 generated due to the melting of the melt region 38 is smaller than the volume of the inner weld burr 41.

The pump 1 has the inner standing wall 41w and the outer standing wall 42w. The inner standing wall 41w is disposed away from the first weld portion and the second weld portion to the inward side in the R direction. The outer standing wall 42w is disposed away from the first weld portion and the second weld portion to the outward side in the R direction.

The inner standing wall 41w prevents the inner weld burr 41 from flowing into the inside of the pump 1. The outer standing wall 42w prevents the outer weld burr 42 from flowing out to the outside of the pump 1.

The method for manufacturing the pump 1 of the embodiment is a method for manufacturing the pump 1 that has the case 30 and the cover 20. The case 30 has the case first opening 31 at the end portion in the Z direction along the central axis C. The case 30 accommodates the components of the pump 1 on the inward side in the R direction perpendicular to the central axis C. The case 30 has the case weld portion 35 along a peripheral edge of the case first opening 31. The cover 20 is disposed side by side with on a side of the case 30 in the Z direction. The cover 20 has the cover opening 21 that faces the case first opening 31. The cover 20 has a cover weld portion 25 along a peripheral edge of the cover opening 21. One of the case weld portion 35 and the cover weld portion 25 is referred to as a first weld portion, and the other thereof is referred to as a second weld portion. The inclined surface 36, which is inclined from the inward side to the outward side in the R direction away from the second weld portion, is formed at the tip end of the first weld portion in the Z direction, and the tip end surface 27 intersecting with the Z direction is formed at the tip end of the second weld portion in the Z direction, and thus the first weld portion and the second weld portion are joined to each other by the vibration welding.

Since the inclined surface 36 is formed at the tip end of the first weld portion, the contact area is reduced and the surface pressure is increased at the contact portion between the first weld portion and the second weld portion. A temperature of the contact portion rises quickly due to frictional heat between the first weld portion and the second weld portion. Rubbing at the contact portion ends in a short time, and the contact portion is melted quickly. As a result, the generation of the powder burrs due to the rubbing at the contact portion is suppressed. The inclined surface 36 of the first weld portion comes into contact with the second weld portion in order from the inward side in the R direction. The inward side in the R direction of the portion in which the powder burrs are generated is already melted. The generated powder burrs are less likely to scatter to the inward side in the R direction. As a result, it is difficult for the powder burrs to remain inside the pump 1.

The flat surface 37 intersecting with the Z direction is formed on the inward side of the inclined surface 36 in the R direction at the tip end of the first weld portion in the Z direction, and thus the first weld portion and the second weld portion are joined to each other by the vibration welding.

In this case, the flat surface 37 of the first weld portion comes into contact with the second weld portion, and thus damage to the tip end of the first weld portion is suppressed as compared to a case in which the flat surface 37 is not present at the tip end of the first weld portion.

The region of the first weld portion which is melted by the vibration welding is referred to as the melt region 38. The height 36z of the inclined surface 36 in the Z direction is smaller than the height 38z of the melt region 38 in the Z direction.

The melt region 38 has the tip end region 38a in which the inclined surface 36 is present, and the base end region 38b in which the inclined surface 36 is not present. In the base end region 38b in which the inclined surface 36 is not present, the vibration welding is performed in a state in which the surface pressure at the contact portion is low. At this time, the welding between the first weld portion and the second weld portion progresses slowly, and the weld layer 40 becomes thick. Therefore, the decrease in welding strength can be suppressed.

The width of the second weld portion in the R direction is larger than the width of the first weld portion in the R direction.

As a result, the vibration welding is performed in a state in which the contact between the tip end of the first weld portion, on which the inclined surface 36 is formed, and the second weld portion is maintained.

In the embodiment, the inclined surface 36 and the flat surface 37 are formed at the tip end of the case weld portion 35. On the other hand, only the inclined surface 36 may be formed at the tip end of the case weld portion 35. In this case, the inclined surface 36 is inclined from the end portion of the case weld portion 35 in the −R direction to the end portion of the case weld portion 35 in the +R direction away from the cover weld portion 25.

The inclined surface 36 in the embodiment is a flat surface. On the other hand, the inclined surface 36 may be a curved surface. The inclined surface 36 may be a curved surface that bulges outward from the case weld portion 35, or may be a curved surface that is recessed inward from the case weld portion 35.

In the embodiment, the case weld portion 35 and the cover weld portion 25 are joined to each other by the vibration welding. On the other hand, the case weld portion 35 and the cover weld portion 25 may be joined to each other by welding such as spin welding. In the spin welding, the powder burrs are generated, similar to the vibration welding.

The cooling component for an automobile of the embodiment is, for example, a pump such as an electric water pump. On the other hand, the cooling component for an automobile of the present invention can be applied to various cooling components such as a valve and a cooling module in which a pump and a valve are integrated, in addition to the pump.

In addition, it is possible to appropriately replace the constituent elements in the above-described embodiments with well-known constituent elements without departing from the spirit of the present invention, and the above-described modification examples may be combined as appropriate.

What is claimed is:

1. A cooling component for an automobile, comprising:
a case that has a case opening at an end portion in a first direction along a central axis, accommodates components of a pump on an inward side in a second direction perpendicular to the central axis, and has a case weld portion along a peripheral edge of the case opening; and
a cover that is disposed side by side with a side of the case in the first direction, has a cover opening facing the case opening, and has a cover weld portion along a peripheral edge of the cover opening,
wherein, when one of the case weld portion and the cover weld portion is referred to as a first weld portion, and the other thereof is referred to as a second weld portion,
an inclined surface, which is inclined from an inward side to an outward side in the second direction away from the second weld portion, is formed at a tip end of the first weld portion in the first direction,
a first flat surface intersecting with the first direction is formed on an inward side of the inclined surface in the second direction at the tip end of the first weld portion in the first direction,
a second flat surface intersecting with the first direction is formed at a tip end of the second weld portion in the first direction, and
the first weld portion and the second weld portion are joined to each other by welding, and
further comprising:
an inner standing wall that is disposed away from the first weld portion and the second weld portion to an inward side in the second direction; and
an outer standing wall that is disposed away from the first weld portion and the second weld portion to an outward side in the second direction.

2. The cooling component for an automobile according to claim 1, wherein a volume of an outer weld burr that extends to an outward side in the second direction from a weld layer between the first weld portion and the second weld portion is smaller than a volume of an inner weld burr that extends to an inward side in the second direction from the weld layer.

3. A method for manufacturing a cooling component for an automobile,
wherein, in a pump which includes:
a case that has a case opening at an end portion in a first direction along a central axis, accommodates components of the pump on an inward side in a second direction perpendicular to the central axis, and has a case weld portion along a peripheral edge of the case opening; and a cover that is disposed side by side with a side of the case in the first direction, has a cover opening facing the case opening, and has a cover weld portion along a peripheral edge of the cover opening, when one of the case weld portion and the cover weld portion is referred to as a first weld portion, and the other thereof is referred to as a second weld portion, an inclined surface, which is inclined from an inward side to an outward side in the second direction away from the second weld portion, is formed at a tip end of the first weld portion in the first direction, a first flat surface intersecting with the first direction is formed on an inward side of the inclined surface in the second direction at the tip end of the first weld portion in the first direction, a second flat surface intersecting with the first direction is formed at a tip end of the second weld portion in the first direction, and the first weld portion and the second weld portion are joined to each other by welding, and the cooling component for an automobile further comprising:

an inner standing wall that is disposed away from the first weld portion and the second weld portion to an inward side in the second direction; and an outer standing wall that is disposed away from the first weld portion and the second weld portion to an outward side in the second direction.

4. The method for manufacturing a cooling component for an automobile according to claim 3, wherein, when a region of the first weld portion which is melted by the welding is referred to as a melt region, a height of the inclined surface in the first direction is smaller than a height of the melt region in the first direction.

5. The method for manufacturing a cooling component for an automobile according to claim 3, wherein a width of the second weld portion in the second direction is larger than a width of the first weld portion in the second direction.

* * * * *